(12) United States Patent
Stoick et al.

(10) Patent No.: US 12,323,273 B2
(45) Date of Patent: Jun. 3, 2025

(54) DATA CONVERTER FOR EMERGENCY SERVICE NETWORK

(71) Applicants: GEO-COMM, INC., St. Cloud, MN (US); RAPIDSOS, INC., New York, NY (US)

(72) Inventors: Darell Stoick, Becker, MN (US); Karl Larsen, Waite Park, MN (US); John Lambaere, Sauk Rapids, MN (US); John Katt, New York, NY (US)

(73) Assignees: GEO-COMM, INC., St. Cloud, MN (US); RAPIDS, INC., New York, NY (US)

( * ) Notice: Subject to any disclaimer, the term of this patent is extended or adjusted under 35 U.S.C. 154(b) by 107 days.

(21) Appl. No.: 18/201,761

(22) Filed: May 25, 2023

(65) Prior Publication Data

US 2024/0396764 A1    Nov. 28, 2024

(51) Int. Cl.
| | |
|---|---|
| *H04L 67/12* | (2022.01) |
| *H04L 12/12* | (2006.01) |
| *H04L 12/46* | (2006.01) |
| *H04L 12/54* | (2022.01) |
| *H04L 12/66* | (2006.01) |
| *H04L 41/0654* | (2022.01) |
| *H04L 69/08* | (2022.01) |
| *H04L 12/70* | (2013.01) |

(52) U.S. Cl.
CPC .......... *H04L 12/5601* (2013.01); *H04L 12/12* (2013.01); *H04L 12/4612* (2013.01); *H04L 12/66* (2013.01); *H04L 41/0654* (2013.01); *H04L 67/12* (2013.01); *H04L 69/08* (2013.01); *H04L 2012/5627* (2013.01)

(58) Field of Classification Search
CPC .  H04L 12/5601; H04L 12/12; H04L 12/4612; H04L 12/66; H04L 67/12
USPC ......................................................... 709/224
See application file for complete search history.

(56) References Cited

U.S. PATENT DOCUMENTS

| | | |
|---|---|---|
| 10,264,122 B1 | 4/2019 | Jensen |
| 10,582,053 B2 | 3/2020 | Jensen |
| 10,999,432 B2 | 5/2021 | Jensen |
| (Continued) | | |

OTHER PUBLICATIONS

TCR, Inside Your Phone: The System on a Chip (SoC), Mar. 1, 2019, https://www.mytcr.com/blog/inside-phone-system-chip-soc/ (Year: 2019).*

*Primary Examiner* — Zi Ye
(74) *Attorney, Agent, or Firm* — Cygan Law Offices PC; Joseph T. Cygan (57) ABSTRACT

A disclosed method includes establishing a secure authenticated network connection between an apparatus located at an emergency communication center (ECC) location and operatively coupled to an ECC functional entity, and an application programming interface (API) endpoint in the cloud; performing an authentication procedure between the apparatus and the application programming interface (API) endpoint in the cloud upon establishment of an internet connection to the apparatus; obtaining data from the functional entity by the apparatus and appending ECC identification information; sending the data as packet data comprising the ECC identification information to the API endpoint; and providing a portal graphical user interface to at least one ECC entity that displays enhanced emergency call data using the packet data.

17 Claims, 4 Drawing Sheets

(56) References Cited

U.S. PATENT DOCUMENTS

| | | |
|---|---|---|
| 11,330,664 B1* | 5/2022 | Martin .................. H04W 4/025 |
| 11,528,772 B2 | 12/2022 | Horelik et al. |
| 11,539,839 B2 | 12/2022 | Jensen |
| 2014/0108575 A1* | 4/2014 | Yao ....................... H04L 51/046 |
| | | 709/206 |
| 2022/0027417 A1* | 1/2022 | Katz ................. G06F 16/90335 |
| 2022/0377841 A1 | 11/2022 | Martin et al. |
| 2023/0034158 A1* | 2/2023 | Anderson ............ H04M 3/5116 |
| 2023/0093284 A1 | 3/2023 | Jensen |

* cited by examiner

DATA CONVERTER FOR EMERGENCY SERVICE NETWORK

CROSS-REFERENCE TO RELATED APPLICATIONS

None.

FIELD OF THE DISCLOSURE

The present disclosure relates generally to enhanced 9-1-1 (E911) and next generation 9-1-1 (NG911) emergency networks and more particularly to methods and apparatuses for retrieving and sending data to emergency networks in a secure manner.

BACKGROUND

The evolution of emergency networks toward achieving full enhanced 9-1-1 (E911) and next generation 9-1-1 (NG911) capabilities has been arduous. Currently, most emergency networks remain a conglomeration of legacy 9-1-1 telecommunications equipment and added in components to begin creating fully enhanced and next generation capabilities.

Emergency networks involve an Emergency Communication Center (ECC) which is defined by the National Emergency Number Association (NENA) as "A set of call takers operating under common management which receives emergency calls for service and asynchronous event notifications and processes those calls and events according to a specified operational policy." A specific type of ECC is a Public Safety Answering Point (PSAP) which NENA defines as an entity responsible for receiving 9-1-1 calls and processing those calls according to a specific operational policy.

ECC and PSAP call takers benefit from various software systems including call handling and call taking software, computer-aided-dispatch (CAD) systems and the like. As ECCs evolve toward advanced capabilities, new requirements for data flow in and out of the ECCs have also become a consideration.

DETAILED DESCRIPTION

Briefly, the present disclosure provides apparatuses and methods for creating a secure authenticated network connection between an Emergency Communications Center (ECC) and a cloud infrastructure. The secure authenticated network connection enables, among other things, the secure extraction of data from the ECC by cloud-based SaaS systems that provide advanced data view and information to call takers at the ECC based on the extracted data.

A disclosed method includes establishing a secure authenticated network connection between an apparatus located at an emergency communication center (ECC) location and operatively coupled to an ECC functional entity, and an application programming interface (API) endpoint in the cloud: obtaining serial data from the functional entity by the apparatus; creating an API message comprising a data payload containing the serial data, and an ECC identifier; and sending the API message comprising the data payload to the API endpoint in a data packet.

The method may further include detecting failure of a serial data port from which the serial data is being obtained: re-initiating the serial port without caching data and without resetting the apparatus: and resuming sending API messages to the API endpoint after re-initiation of the serial port. The method may further include detecting loss of an internet connection over which the API message is being sent to the API endpoint in the cloud; listening for restoration of the internet connection without caching data and without resetting the apparatus; and resuming sending API messages to the API endpoint after detection of restoration of the internet connection. The method may further include performing an authentication procedure between the apparatus and the application programming interface (API) endpoint in the cloud upon establishment of an internet connection to the apparatus. The method may further include: obtaining the serial data from the functional entity comprising automatic number identification (ANI) and automatic location identification (ALI) data; and creating the data payload containing the ANI data and ALI data. The method may further include filtering noise data from the serial data to obtain the automatic number identification (ANI) and automatic location identification (ALI) data. The method may further include establishing the secure authenticated network connection upon power up of the apparatus: and beginning receiving serial data and creating and sending API messages upon power up of the apparatus.

In some embodiments, creating an API message with a data payload containing the serial data, and an ECC identifier may include creating a JSON message. In some embodiments, creating an API message with a data payload containing the serial data, and an ECC identifier, may include creating the data payload as a JSON message.

One disclosed apparatus includes: a serial port and a network port operative to connect to the internet: a processor operatively coupled to the serial port and the network port: and a thin script, stored in non-volatile, non-transitory memory that is operatively coupled to the processor. The thin script, when executed by the processor, is operative to: receive serial data from an emergency communication center (ECC) functional entity operatively coupled to the serial port: establish a secure authenticated network connection to application programming interface (API) endpoint in a cloud-hosted infrastructure: obtain serial data from an emergency communication center (ECC) functional entity: convert the serial data to packet data including an ECC identifier: send the packet data to the API endpoint: and resiliently handle connection failures without resetting the processor.

The thin script may be further operative to resiliently handle connection failures without resetting the processor, by resiliently handling a serial port failure by re-initiation of the serial port without caching data and without resetting the processor. The thin script may be further operative to resiliently handle connection failures without resetting the processor. by: resiliently handling internet connection loss without caching data and without resetting the processor by listening for restoration of the internet connection: and resuming sending packet data to the API endpoint in response to restoration of the internet connection.

In some embodiments, the thin script is written using an interpreted, object-oriented, high-level programming language with dynamic semantics. In some embodiments, the processor is a system on a chip (SoC). In some embodiments, the processor is an ARM processor.

Another disclosed apparatus includes: a serial port and a network port operative to connect to the internet: a processor operatively coupled to the serial port and the network port, the processor operative to: receive serial data from an emergency communication center (ECC) functional entity operatively coupled to the serial port; establish a secure authenticated network connection to application programming interface (API) endpoint in a cloud-hosted infrastructure; obtain serial data from an emergency communication center (ECC) functional entity; convert the serial data to packet data including an ECC identifier; send the packet data to the API endpoint: and resiliently handle connection failures without resetting the processor.

The processor may be further operative to resiliently handle connection failures without resetting the processor, by: resiliently handling a serial port failure by re-initiation of the serial port without caching data and without resetting the processor. The processor may be further operative to resiliently handle connection failures without resetting the processor by: resiliently handling internet connection loss without caching data and without resetting the processor by listening for restoration of the internet connection; and resuming sending packet data to the API endpoint in response to restoration of the internet connection.

In some embodiments, the processor is a system on a chip (SoC). In some embodiments, the processor is an ARM processor.

Figure 1:
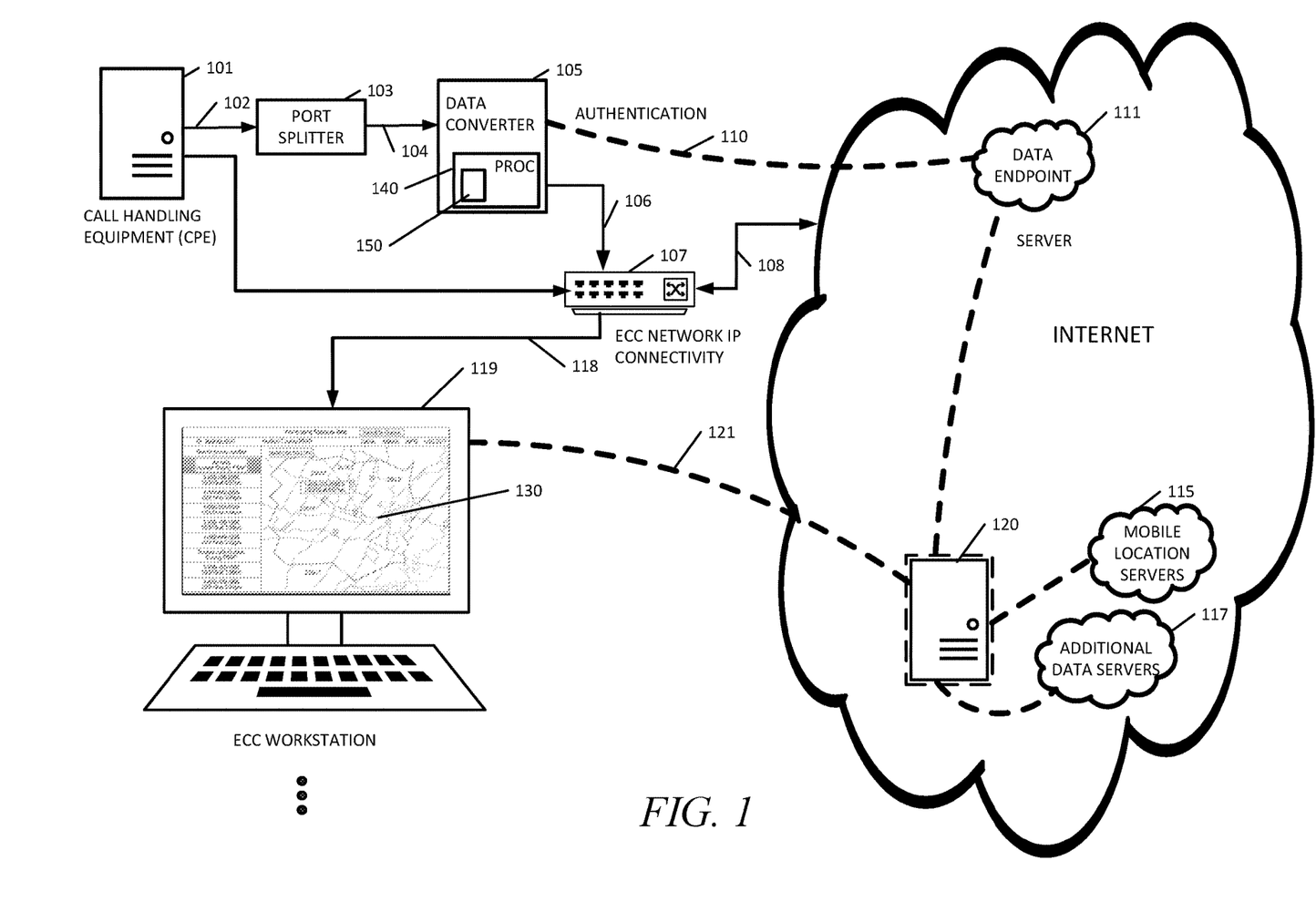
FIG. 1 is a block diagram of an Emergency Communication Center (ECC) in communication with a cloud infrastructure and with a software-as-a-service (Saas) emergency data management system, in accordance with an embodiment. The ECC may be a Public Safety Answering Point (PSAP).

Turning now to the drawings wherein like numerals represent like components, FIG. 1 is a block diagram of an Emergency Communication Center (ECC) in communication with a cloud infrastructure and with at least one data endpoint 111 and a software-as-a-service (SaaS) emergency data management system 120, in accordance with an embodiment. The ECC may be a Public Safety Answering Point (PSAP).

The ECC includes Customer Premises Equipment (CPE) 101 which is a set of communications or terminal equipment located in the ECC or PSAP facilities. In telecommunications, the acronym "CPE" may be defined as "customer-premises equipment" or "customer-provided equipment" and refers to any terminal and associated equipment located at a telephone system subscriber's premises and connected with a telephone carrier's telecommunication circuits at a demarcation point. The demarcation point established in a building or complex, or some specific location, separates the specific customer equipment (i.e., the ECC or PSAP equipment) from other equipment located in either the distribution infrastructure or central office of the communications service provider (such as a telephone carrier).

Examples of equipment that may be included in a CPE may include, but are not limited to, active equipment and devices such as telephones, routers, network switches, gateways, networking adapters and Internet access gateways that enable the ECC to access communication services and distribute them within an ECC local area network (LAN); or passive equipment such as analogue telephone adapters (ATA) or xDSL-splitters, including various telephone systems, private branch exchanges (PBXs), etc. Some of this equipment may be devices purchased by the ECC, however some may be provided by one or more service providers that provide telecommunications or other services to the ECC. The ECC CPE may have one or more racks or chassis to encase and hold the CPE equipment and to enable cabling and interconnection via various CPE-peripherals.

One specific example equipment in an ECC CPE is an Automatic Number Identification Controller (ANI Controller) which is defined by NENA as a "stand-alone CPE component which provides the ANI decoding and function key control for 9-1-1 service." The ANI (Automatic Number Identification) refers to a telephone number (i.e., a "caller ID") associated with the access line from which a call originates, and in legacy trunked telephony lines is transmitted to an ECC on a sideband channel transmitted on a trunked line. Assuming the system is operating properly, the ECC receives an ANI number associated with a 9-1-1 emergency call as it arrives. Another example equipment in an ECC CPE is an Automatic Location Identification Controller (ALI Controller), which may be operatively coupled to an ALI modem bank and which plays a role in sending location queries to an ALI database. ANI and ALI functions may also be combined in an ANI-ALI Controller. Additionally ANI Controller functions, ALI Controller functions, or both may be integrated into other ECC functional entities.

Procedurally, an ECC then sends an "ALI Request" which is defined by NENA as a "query for an ALI record sent from the PSAP to the ALI database." The ECC or PSAP may also perform "ALI Retrieval" which NENA defines as "the process by which a PSAP queries an ALI database with an ALI Request and receives a response with location and other available information." The term "ALI" (Automatic Location Identification) is defined by NENA as "the automatic display at the PSAP of the caller's telephone number, the address/location of the telephone and supplementary emergency services information of the location from which a call originates." The ANI and ALI data collectively may be referred to as "ANI/ALI" data.

The ECC also includes "call handling" which NENA defines as "a functional element concerned with the details of the management of calls." According to NENA, call handling handles all communication from the caller and includes the interfaces, devices and applications utilized to handle the call. A "functional element" or "functional entity" is defined by NENA as "a set of software features that may be combined with hardware interfaces and operations on those interfaces to accomplish a defined task." The ECC includes an APU (Answering Position Unit) which is defined by NENA as "a term used to define call-taking equipment." The ECC workstation 119 shown in FIG. 1 may be referred to as an APU and is operatively coupled to the ECC LAN via connection 118 to the ECC network IP connectivity 107. The ECC network IP connectivity 107 may be, for example, a network switch connected to backhaul 108 such as, for example, one or more T1 telecommunications lines or the like to provide Internet access and telephone network access to the ECC. The ECC network IP connectivity 107 may be located within a rack of the CPE 101. Depending on the size of the ECC, multiple APUs such as ECC workstation 119 may be present at the ECC with each one operatively coupled to the ECC LAN and the Internet via a network connection 118 to the ECC network IP connectivity 107 or to an internal ECC LAN router etc. Additionally, there may be separate APUs for call handling and CAD, or call handling and CAD software systems may be operating together on a single APU such as ECC workstation 119.

Calls received by the ECC come into the ECC via the CPE 101 and are internally routed to an ECC workstation 119 (i.e., an APU) as appropriate per the specific ECC call handling operational procedures implemented by the CPE 101 and any intermediary call handling.

The term "call" as used herein comports with the NENA definition as "a generic term used to include any type of Request For Emergency Assistance (RFEA); and is not limited to voice." Therefore, the term "call" may include a session established by signaling with two-way real-time media and involves a human making a request for help." The terms "voice call", "video call" or "text call" are used herein when the specific media is of significance. As per NENA definitions, the term "call" may refer to either a "voice call", "video call", "text call" or "data-only call", since they are handled the same way through most of NG9-1-1."

In the embodiment shown in FIG. 1, a functional element of the CPE 101 is connected to a port splitter 103 via a serial connection 102. In one example, serial connection 102 may be a DB 9 or DB 25 type connection. In another example, serial connection 102 may be a USB type connection.

In some embodiments, the functional element may be an ALI Controller or an ANI-ALI Controller. In another embodiment the functional element may be an ALI Controller or an ANI-ALI Controller that is integrated into a call handling functional element. In yet another embodiment, the functional element may be an ALI modem bank that is operatively coupled to a standalone ALI Controller, a standalone ANI-ALI Controller, or to an ALI Controller that is integrated into a call handling functional element. In any of these various implementations, the ALI Controller or ANI-ALI Controller, whether standalone or integrated, and the ALI modem bank, or either of them, have a limited number of available serial ports. The port splitter 103 is used when needed to accommodate providing one or more additional serial ports. Therefore, in some embodiments the serial port splitter 103 may not be required.

In the case of ANI/ALI data, either the port splitter 103 or an ALI Controller, ANI-ALI Controller, etc. provide a serial data input 104 to a data converter 105, which may be a serial-to-IP (Internet Protocol) packet converter, which is operative to receive serialized data and convert it to packetized data for transmission over the Internet. The serial data input 104 may be a DB 9, a DB 25, or a USB connection. The data converter 105 is operatively coupled to the ECC network IP connectivity 107 via a connection 106 which may be, for example, an Ethernet cable. The ECC network IP connectivity 107 provides the backhaul 108 connections to the Internet.

Figures 2, 3:
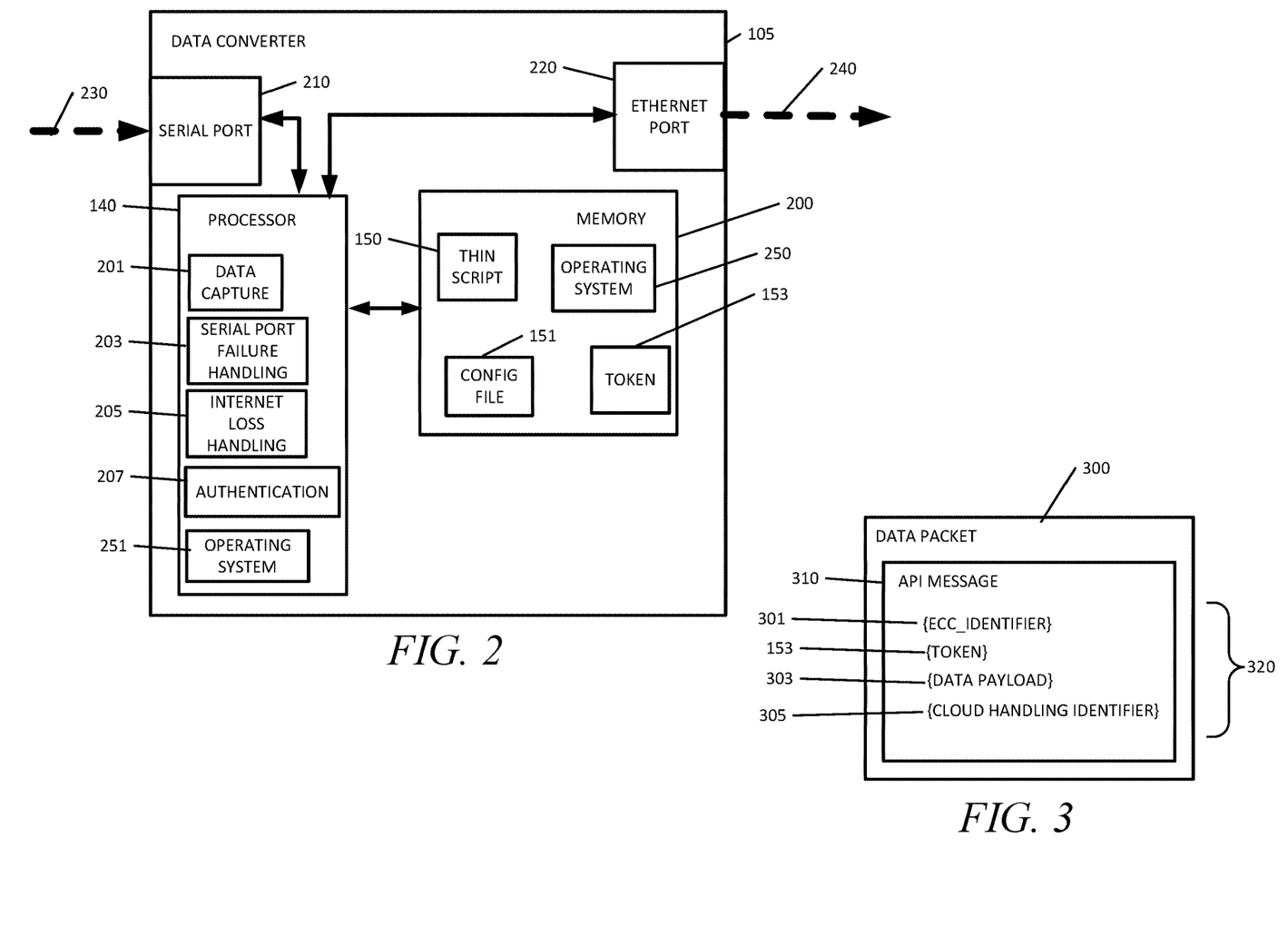
FIG. 2 is a block diagram of a data converter having a thin script in accordance with various embodiments.
FIG. 3 is a block diagram of a packet output by the data converter in accordance with various embodiments.

FIG. 2 provides further details of the data converter 105. The data converter 105 includes a power supply input (not shown) to receive a DC voltage input which supplies power to its various internal components. The data converter 105 includes at least one processor 140 operative to execute a thin script 150. The thin script 150 is a lightweight executable code, (i.e., software that requires only a small amount of memory and processing requirements), that is operative to implement a secure authenticated connection 110 with a cloud network and a data endpoint 111, shown in FIG. 1, among other functions. The thin script 150 is also considered lightweight executable code in that it executes on an SoC (system on a chip) MPU (microprocessor unit) such as, for example an ARM energy efficient processor. The data converter 105 includes a non-volatile, non-transitory memory 200 that is operative to store executable instructions, such as the thin script 150, for executing by the processor 140. The memory 200 is also operative to store a configuration file 151 and a token 153. The processor 140 is operatively coupled to the non-volatile, non-transitory memory 200, to at least one serial port 210 and to at least one Ethernet port 220. In the various embodiments, the processor 140 may be an MPU SOC such as an ARM processor, a digital signal processor, a ASIC, an FPGA, etc. The serial port 210 provides a COM port serial interface to the processor 140 for example, an RS-232 compliant port. The serial port 210 may include a universal asynchronous receiver/transmitter (UART) in some embodiments. The Ethernet port 220 may include a network interface controller (NIC) in some embodiments. The Ethernet port 220 is operative to connect to the Internet and may include an RJ45 connector in some embodiments.

The memory 200 stores operating system executable instructions 250 which may be, for example, a Linux based operating system. Upon power up of the data converter 105, the processor is operative to execute operating system code 250 to implement the operating system 251. Also, upon power up of the data converter 105, the thin script 150 is immediately executed and performs an authentication procedure with the data endpoint 111 (shown in FIG. 1) using information contained in the configuration file 151. The thin script 150 configures the processor 140 such that the processor 140 is operative to perform the various operations described herein. Among other advantages, the processor 140, by configuration via the thin script 150 performs the special purposes herein defined and operates with resiliency to failures such as serial port failure or loss of internet connectivity. The thin script 150 maintains operation of the overall system without shutting down or resetting the processor and without a "system crash."

The configuration file 151 contains a client key and client secret (i.e., credentials) specific to the ECC at which the data converter 105 is installed. Each ECC therefore has its own unique configuration file 151 however the same thin script 150 is used at each of various multiple ECC locations. The configuration file 151 also contains a unique ECC identifier specific to the ECC at which the data converter 105 is installed. The thin script 150, when executed, provides data capture logic 201, serial port failure handling logic 203, internet loss handling logic 205, and authentication logic 207, all within the single thin script 150.

Upon startup of the data converter 105, the thin script 150 informs the data endpoint 111 of its presence by sending its credentials, and informs the data endpoint 111 that it will begin sending data to it from the ECC. In some embodiments, thin script 150 may be object-oriented programming code. In some embodiments, the thin script 150 may be an interpreted, object-oriented, high-level programming language with dynamic semantics. The thin script 150 may further include high-level built-in data structures, dynamic typing and dynamic binding. In one example embodiment, the thin script 150 may be written using Python Programming Language.

In the various embodiments, the secure authenticated connection 110 provides the ECC with a high level of isolation from other ECCs accessing the emergency data management system 120 and also provides the ability to customize the network configuration to meet the ECC specific requirements. The data converter 105 may then send data to the data endpoint 111 such as ANI/ALI data, etc.

The data converter 105 may have stored all necessary login credentials such as a client key and client secret, such that it is operative to establish the secure authenticated connection 110 in a plug-and-play like manner, for example, upon having an internet connection made to the data converter 105 after it is operatively coupled to a functional entity of the ECC. As used herein, "plug-and-play like manner" means that the apparatus, such as the data converter 105, facilitates the recognition of an ECC functional entity and the data endpoint 111 without the need for user intervention or with limited user intervention. Provided that the configuration file 151 is present, and an initial token 153, the data converter 105 may connect to the data endpoint 111 and begin sending data. The connection 110 between the data converter 105 and the data endpoint 111 may be, for example, a TLS (Transport Layer Security) encrypted network connection.

The thin script 150 implements authentication logic 207 which provides an authenticated and labeled output to the data endpoint 111 using an ECC identifier. The authentication logic 207 is program logic operative to add an ECC identifier to a packet data 230 it creates and outputs, using serial data 230 received from the ECC functional entity and sent over connection 110. The thin script 150 is operative to perform authentication to reliably identify the ECC credentials to the data endpoint 111.

FIG. 3 is an example data packet 300 sent out by the data capture logic 201 as packet data 230 to the data endpoint 111. The data packet 300 includes in its data payload, an application programming interface (API) message 310. The API message 310 includes message data fields 320. The message data fields 320 include the ECC identifier 301, the token 153, a data payload 303 and a cloud handling identifier 305. Because the data endpoint 111 is a multi-tenant data endpoint in the cloud the cloud infrastructure uses the cloud handling identifier 305 to perform handling operations within the cloud infrastructure. The data payload 303 may itself be an API message such as, for example, a JSON message. The ECC identifier 301 identifies the specific ECC to which the data payload belongs. The data payload may be, for example, a payload of ANI/ALI data received as serial data 230, after it has been packetized. The token 153 may expire after a given period of time, for example, 24 hours, or any shorter or longer time interval, and the thin script 150 may perform an API call to retrieve a new token as needed. In the various embodiments, an ECC identifier is any unique identifier unique to the specific ECC at which the data converter 105 is installed.

The data endpoint 111 is a multi-tenant API endpoint and may be considered as the end of a communication channel between a functional entity at the CPE 101 and the cloud infrastructure. As mentioned above, the functional entity may be an ALI Controller, ANI-ALI Controller, call handling with an integrated ALI Controller, etc. In that context, the data endpoint 111 may be considered an ANI/ALI API (application programming interface) endpoint which enables the data converter 105 to communicate with the data endpoint 111 in the cloud. For example, the data endpoint 111, via an ANI/ALI API, may request resources over the connection 110. More specifically, the thin script 150 posts API messages, such as example API message 310, to the date endpoint 111 using the data packet 300.

In some embodiments, the authentication logic 207 implements an OAuth authentication between the data converter 105 and the data endpoint 111. In one example implementation, the data converter 105 sends an authentication request to the data endpoint 111, along with any necessary credentials for the ECC. The authentication logic 207 sends the credentials and performs an API call to retrieve the token 153 if the token has expired and the data endpoint 111 verifies the credential, and that the data converter 105 has an unexpired token. If the data converter 105 is authorized, the data endpoint 111 sends a response back to the data converter 105, indicating that the authentication was successful. If the data converter 105 is not authorized, the data endpoint 111, sends a response back to the data converter 105, indicating that the authentication was unsuccessful. The data converter 105 may then need to try again with different credentials.

In some embodiments, the ANI/ALI API may be a RESTful API in which each ECC data converter 105 may represent an endpoint from which the data endpoint 111 can obtain ANI/ALI data. The ANI/ALI API therefore may define at least one URL endpoint with a domain, port, path, and/or query string and within these definitions will be a unique ECC identifier. The endpoints may be defined via IPv4 addresses (and ports) or via IPv6 addresses (and ports).

The data endpoint 111 also provides data, such as ANI/ALI data, to the emergency data management system 120 which may include one or more virtual servers, hardware servers, etc. as required to provide SaaS capability to the various ECCs. The data management system 120 provides a web portal graphical user interface (GUI), web portal GUI 130, to one or more ECC workstations 119 of multiple ECCs. The web portal GUI 130 provides a map view with location indicators corresponding to emergency calls directed to the ECC (whether call routing is completed or not) and a call queue with ANI (called ID) data for each call. The web portal GUI 130 via a web socket connection 121 between a browser executing on the ECC workstation 119 and the emergency data management system 120 as a cloud-based application. The web socket connection 121 may be established as a persistent connection and run over the top of a TCP (Transmission Control Protocol) connection. The web portal GUI 130 may be viewed as displaying an instance of the SaaS (software-as-a-service) cloud-based application provided by the emergency data management system 120. That is the browser executing on the ECC workstation 119 provides an instance of the cloud-based application and other ECC workstations may provide other instances of the cloud-based application such that multiple instances of the cloud-based application are provided to the ECC via the emergency data management system 120. Furthermore, additional instances of the cloud-based application may be provided to other ECCs by the emergency data management system 120.

The emergency data management system 120 is operative to receive mobile device location data, and other emergency data, from various mobile location servers 115 and from additional data servers 117. The mobile location servers 115 receive hybrid location data from mobile devices via Internet connectivity and the data may include for example, but are not limited to, Android Mobile Location (AML) data, Android Emergency Location Service (ELS) data, and Hybridized Emergency Location (HELO) data provided by iOS™ devices, and other mobile device location data, etc. The emergency data management system 120 uses the data from the data endpoint 111 to identify emergency location data and other data associated with device identifiers (i.e., ANI/ALI data) and can match up data from the data endpoint 111 with other available emergency data to provide more complete and accurate information to the ECCs. The match up of data endpoint 111 data with data received by the emergency data management system 120 enables identification of emergency calls that have been routed to the ECC via telephony routing.

However, the emergency data management system 120 information is not limited to emergency calls that have been routed to the ECC and the data obtained from the mobile location servers 115 and additional data servers 117 can be obtained by the emergency data management system 120 and provided to the web portal GUI 130 prior to the ECC receiving and answering the call. Put another way, the emergency data management system 120 is operative to receive mobile location data and additional data from mobile location servers 115 and additional data servers 117 for mobile devices that have initiated emergency calls, whether or not those emergency calls have been completed, or were disconnected, and whether or not those emergency calls were routed through telecommunications networks to the ECC, and whether or not emergency calls that may have been successfully routed to the ECC were answered or not at the ECC.

Therefore, emergency data management system 120 is operative to provide an emergency call queue and a map view on the web portal GUI 130 that shows location indicators for devices from which emergency calls have emanated even before completion of the emergency call routing to the ECC. The ANI/ALI data is used by the emergency data management system 120 to distinguish calls that have already been received by (i.e., routed via the telecommunications networks to) the ECC and provide more detailed and usable data.

Because the authentication logic 207 within the data converter 105 adds an ECC identifier to data it receives, likewise the emergency data management system 120 identifies that data, using the ECC identifier to push related data for the specific ECC to an appropriate ECC workstation (i.e., and ECC workstation that belongs to the specific ECC).

The emergency data management system 120 may also determine which ECC should receive what data based on related mobile device location and whether a specific device that placed a call is located within an ECC geofence specified in a geofence database. Alternatively, where an ECC may not have a specified geofence in the geofence database, the emergency data management system 120 may use a reference source such as, but not limited to, a NENA PSAP Database Tool, for example commercial PSAP databases, NENA PSAP databases, NG911 ECRF and Forest Guide queries, and NG911 agency locator service queries.

The initial emergency call queue portion of the web portal GUI 130 may be displayed in various distinct colors, font styles, or using distinctive icons such that the call takers understand each entry in the queue and can also distinguish between incoming calls and calls that have been placed but not yet received.

As emergency data management system 120 detects calls arriving at the ECC via the data endpoint 111 data it receives, the emergency data management system 120 can either change the call queue entry color, font style, or icon, etc. for queue entries related to calls that have been received by the ECC such that the change appears on the web portal GUI 130.

In another implementation, the emergency data management system 120 can create a separate emergency call queue on the web portal GUI 130 that is specific to the ECC workstation on which it is displayed. The specific emergency call queue can display, for example, only emergency calls related to device identifiers received by the specific workstation.

Similarly, the map view provided by the web portal GUI 130 may display location indicators for devices from which emergency calls have emanated before completion of the emergency call routing to the ECC differently than location indicator for emergency calls that have been received at the ECC. The web portal GUI 130 may display location indicators in various distinct colors, using different font styles, or using distinctive icons such that the call takers understand each location point and can distinguish between incoming call locations and call that have been placed from a location but not yet received at the ECC.

The map view provided by the web portal GUI 130 may also display additional data from the additional data servers 117 using various distinct colors, using different font styles, or using distinctive icons. For example, different icons may be used for police, fire, medical, or other types of emergency and related additional data. The location indicators and other indicators may be displayable in a layer format in which a user of the web portal GUI 130 may turn layers on and off depending upon the operator's preferences or specific needs during handling a call or dispatch operations. For example, a layer having medical data may be toggled on and off, etc.

The data endpoint 111 may send data to the emergency data management system 120 in a streaming manner, or as a data push operation, as the data is obtained from the data converter 105. In response to receiving data from the data endpoint 111 whether sent in a data stream, as a push operation, or as a data query made via the web portal GUI 130 by a call taker/operator, the emergency data management system 120 provides, or returns in response to a query, emergency data which includes, but is not limited to, augmented device location information and other additional data.

In some embodiments, the data converter 105 or data converter 105 may have been stored in non-volatile, non-transitory memory 200, an authentication keyset. In some embodiments, the authentication keyset may be an OAuth (Open Authorization) keyset.

In some embodiments, the keyset may consist of two or more keys, such as but not limited to, a client key and a client secret. The client key is a public key that is used to identify the ECC that is requesting access to the data endpoint 111. The client secret is a private key that is used to authenticate the ECC and verify that it is authorized to access the data endpoint 111. In some embodiments, the data converter 105 must present both the client key and the client secret to the data endpoint 111 during authentication. The authentication logic 207, will then verify the ECC credentials and, if the ECC is authorized, grant access to the data endpoint 111.

Therefore, authentication is used in connecting the data converter 105 to the data endpoint 111 to provide a high level of security, by enabling secure access to the data endpoint 111 by verifying the ECC identity and ensuring that the ECC has the necessary permissions to access the data endpoint 111. Additionally, connection 110 is used to create a secure, encrypted connection between the data converter and the cloud infrastructure, so as to protect the privacy and security of data being sent over the internet connection.

The data capture logic 201 is operative to receive serial data 230 via the serial port 210, (i.e., a COM port), and to filter out flag bits and ancillary unwanted data ("noise data") that may be contained in the serial data 230. For example, the data capture logic 201 is operative to filter out noise data from the serial data 230 to obtain ANI/ALI data. The data capture logic 201 is then further operative to create a data payload 303 within the API message 310 where the data payload 303 contains the ANI/ALI data from the serial data 230. Put another way, the ANI/ALI data is placed into a data payload of API message 310 and the API message 310 is sent as a data payload in data packet 300 to the date endpoint 111. The ECC identifier 301 is included with the data payload 303 such that the data payload 303 can be associated with the ECC specific to the ECC identifier 301. The data capture logic 201 therefore performs a serial-to-packet conversion of the serial data 230.

The API message 310 may be sent by the data capture logic 201 using a RESTful API HTTP method such as POST. More specifically, the data capture logic 201 may use the POST method to send ANI/ALI data to the data endpoint 111 and to create or update a resource. When the data capture logic 201 sends a POST request to the data endpoint 111, it will normally be accompanied by a payload of data that is used to create or update the resource on the data endpoint 111. In some embodiments, the data may be in the form of a JSON object. In some embodiments, the data may be in XML format. The data capture logic 201 may also use the PUT method to update an existing resource on the data endpoint 111. The data endpoint 111 may send ANI/ALI updates via PUT when a mobile device in an emergency call changes locations, or a medical situation changes, etc.

The emergency data management system 120 uses any of the RESTful API HTTP methods such as GET, POST, PUT, and DELETE to handle data at the date endpoint 111 and also to provide data to the web portal GUI 130 displayed on the ECC workstation 119.

Figure 4:
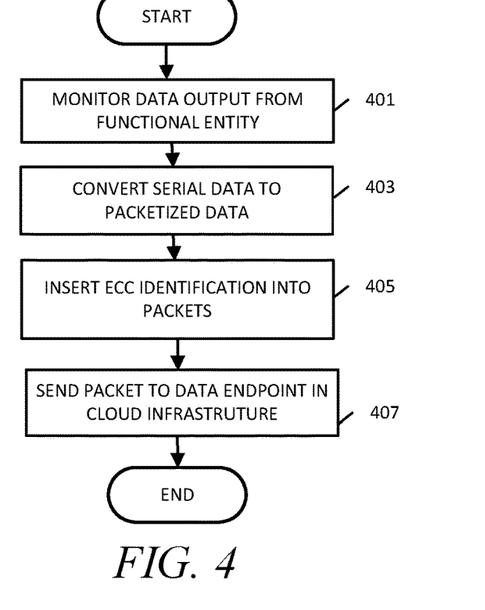
FIG. 4 is a flowchart of a method of operation of a data capture logic in accordance with various embodiments.

FIG. 4 is a flowchart of a method of operation of data capture logic in accordance with various embodiments. In operation 401, the data capture logic 201 monitors an ECC functional entity data output. The data output of the ECC functional entity may be provided to the data capture logic 201 as serial data 230. In operation 403, the data capture logic 201 converts the serial data 230 to packet data 240 and in operation 405 the data capture logic 201 inserts an ECC identifier 301 into the data packets. In operation 407, the data capture logic 201 sends the packets to the data endpoint 111 in the cloud infrastructure.

Figure 5:
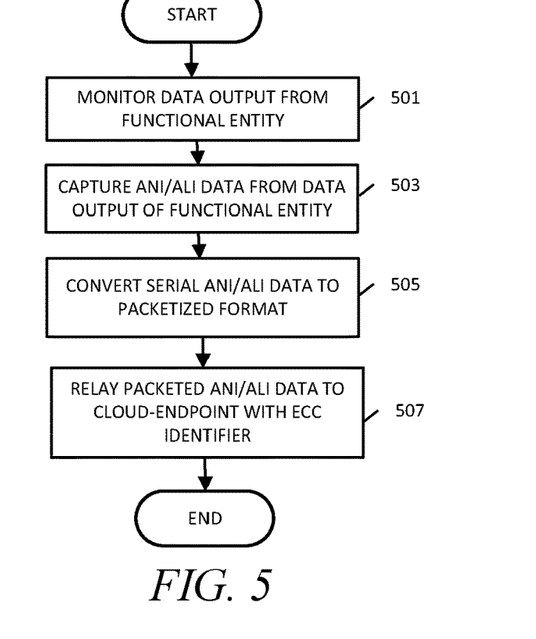
FIG. 5 is a flowchart is a flowchart of a method of operation of a data capture logic in accordance with various embodiments.

In FIG. 5 the data capture logic 201 monitors an ECC functional entity data output in operation 501. In operation 503 the data capture logic 201 captures ANI/ALI data from the serial data output of the functional entity. In operation 505, the data capture logic 201 converts the serial data to packet format data. In operation 507, the data capture logic 201 relays the packetized ANI/ALI data to the cloud data endpoint 111.

Figure 6:
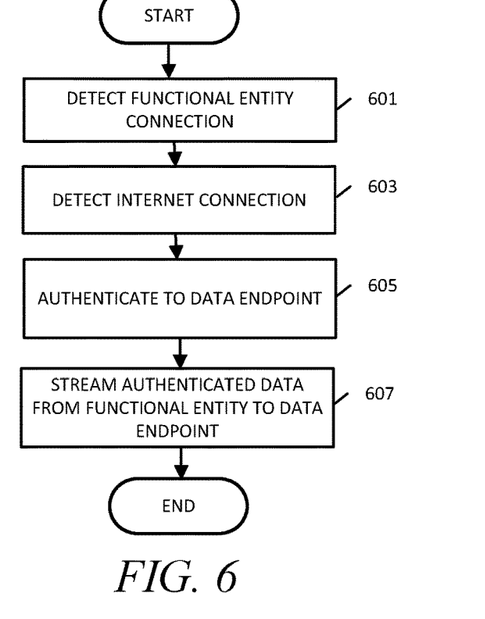
FIG. 6 is a flowchart of a method of operation of a data capture logic in accordance with various embodiments.

In FIG. 6 the data capture logic 201 detects that an ECC functional entity is connected in operation 601 and detects an Internet connection in operation 603. In operation 605, the data capture logic 201 performs an authentication with the data endpoint 111. In operation 607, the data capture logic 201 begins to send authenticated data from the functional entity to the data endpoint 111.

Figure 7:
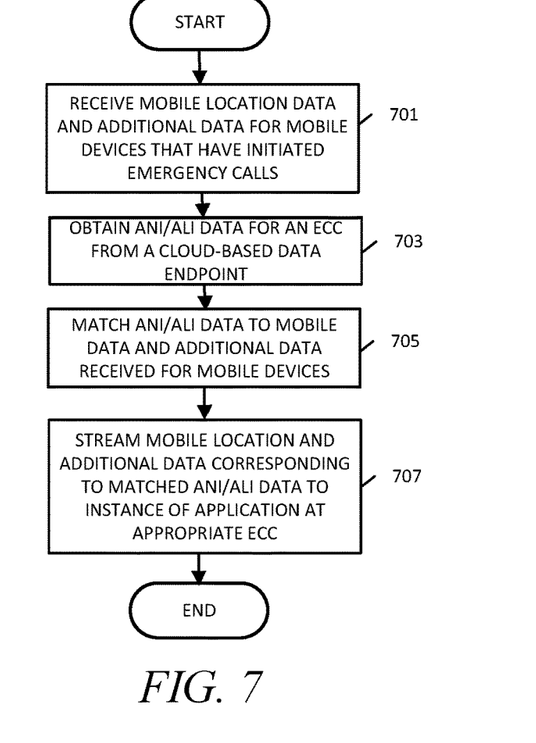
FIG. 7 is a flowchart of a method of operation of a cloud-based emergency data management system in accordance with various embodiments.

FIG. 7 is a flowchart of a method of operation of a cloud-based emergency data management system in accordance with various embodiments. In operation 701, the cloud-based emergency data management system 120 receives mobile location data and additional data for mobile devices that have initiated emergency calls. In operation 703, the cloud-based emergency data management system 120 obtains ANI/ALI data for an ECC from a cloud-based data endpoint 111. In operation 705, the cloud-based emergency data management system 120 matched mobile data and additional data to the ANI/ALI data received from the data endpoint 111. In operation 707, the cloud-based emergency data management system 120 streams mobile location and additional data corresponding to the matched ANI/ALI data to an instance of the emergency data management system 120 application executing on a workstation of the appropriate ECC.

Figure 8:
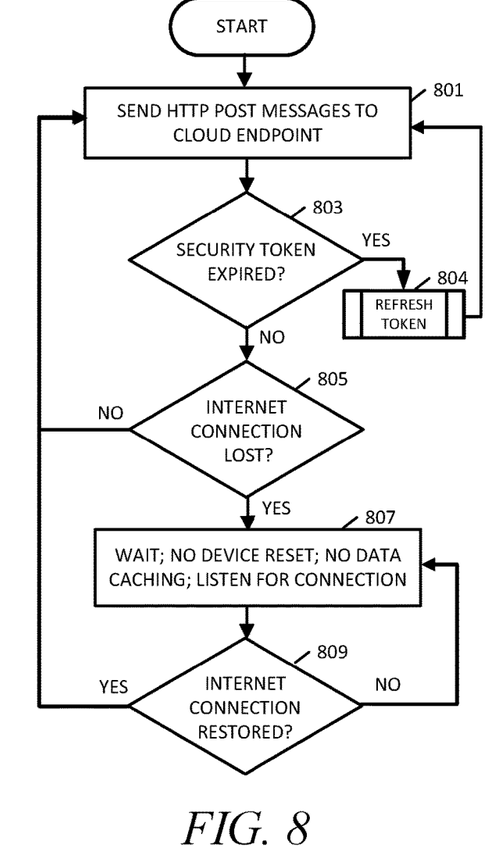
FIG. 8 is a flowchart of a method of operation of internet loss handling logic in accordance with various embodiments.
Figure 9:
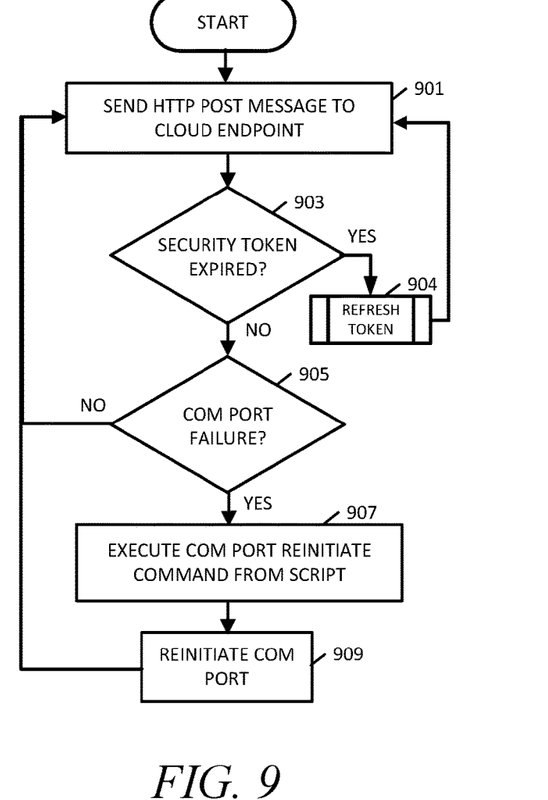
FIG. 9 is a flow chart of a method of operation of serial port failure handling logic in accordance with various embodiments.

The flowcharts of FIG. 8 and FIG. 9 are methods of operation of the thin script 150 in the event of internet connection loss and COM port failure, respectively. In the method of operation of FIG. 8, after the data converter 105 is powered on, the thin script 150 executes and begins sending HTTP POST messages, which are API messages 310, to the data endpoint 111 as shown in operation 801. The thin script 150 executes as a loop operation provided it has a valid security token 153 as shown in decision operation 803. If the token is expired at decision operation 803, the authentication logic 207 will perform an API call to refresh the token as shown in operation 804, and will continue sending HTTP POST messages as in operation 801.

If the internet connection is interrupted or lost in decision block 805, the thin script 150 will not crash. Instead, the internet loss handling logic 205 is invoked and the thin script 150 waits in operation 807. The internet loss handling logic 205 does not allow the thin script 150 to cache any data, and does not reset the data converter 105. This continues until the internet connection is restored in decision 809. If the internet connection is restored (i.e., HTTP is available) then the thin script 150 returns to sending HTTP POST messages in operation 801 based on the current existing serial data 230.

In the method of operation of FIG. 9, after the data converter 105 is powered on, the thin script 150 executes and begins sending HTTP POST messages, which are API messages 310, to the data endpoint 111 as shown in operation 901. The thin script 150 executes as a loop operation provided it has a valid security token 153 as shown in decision operation 903. If the token is expired at decision operation 903, the authentication logic 207 will perform an API call to refresh the token as shown in operation 904, and will continue sending HTTP POST messages as in operation 801.

If the serial port, i.e., COM port, fails at decision block 905, the thin script 150 will not crash. Instead, the serial port failure handling logic 203 executes a COM port reinitiate command in operation 907 and the COM port is reinitiated at operation 909. The thin script 150 does not cache any data, and does not reset the data converter 105. The thin script 150 returns to sending HTTP POST messages in operation 901 based on the current existing serial data 230.

The thin script 150 therefore provides a high level of resiliency to internet outages and serial port failures and will not crash under such conditions. The data flow from the ECC functional entity to the data endpoint 111 is therefore likewise resilient. Although some data may be lost during the temporary outage, operation is immediately resumed upon either re-initiation of the serial port in the case of COM port failure, or restoration of internet connectivity in the case of internet loss.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A method comprising:
establishing, by an apparatus, a secure authenticated network connection between an apparatus located at an emergency communication center (ECC) location and operatively coupled to an ECC functional entity, and an application programming interface (API) endpoint in a cloud-based infrastructure;
obtaining serial data from the functional entity by the apparatus;
creating an API message comprising a data payload containing the serial data, and an ECC identifier; and
sending the API message comprising the data payload to the API endpoint in a data packet;
detecting failure of a serial data port from which the serial data is being obtained;
re-initiating the serial port without caching data and without resetting the apparatus; and
resuming sending API messages to the API endpoint after re-initiation of the serial port.

2. The method of claim 1, further comprising:
performing an authentication procedure between the apparatus and the application programming interface (API) endpoint in the cloud-based infrastructure upon establishment of an internet connection to the apparatus.

3. The method of claim 1, further comprising:
obtaining the serial data from the functional entity comprising automatic number identification (ANI) and automatic location identification (ALI) data; and
creating the data payload containing the ANI data and ALI data.

4. The method of claim 3, further comprising:
filtering noise data from the serial data to obtain the automatic number identification (ANI) and automatic location identification (ALI) data.

5. A method comprising:
establishing, by an apparatus, a secure authenticated network connection between an apparatus located at an emergency communication center (ECC) location and operatively coupled to an ECC functional entity, and an application programming interface (API) endpoint in a cloud-based infrastructure;
obtaining serial data from the functional entity by the apparatus;
creating an API message comprising a data payload containing the serial data, and an ECC identifier; and
sending the API message comprising the data payload to the API endpoint in a data packet;
detecting loss of an internet connection over which the API message is being sent to the API endpoint in the cloud-based infrastructure;
listening for restoration of the internet connection without caching data and without resetting the apparatus; and
resuming sending API messages to the API endpoint after detection of restoration of the internet connection.

6. A method comprising:
establishing, by an apparatus, a secure authenticated network connection between an apparatus located at an emergency communication center (ECC) location and operatively coupled to an ECC functional entity, and an application programming interface (API) endpoint in a cloud-based infrastructure;
obtaining serial data from the functional entity by the apparatus;
creating an API message comprising a data payload containing the serial data, and an ECC identifier;
sending the API message comprising the data payload to the API endpoint in a data packet;
establishing the secure authenticated network connection upon power up of the apparatus; and
beginning receiving serial data and creating and sending API messages upon power up of the apparatus.

7. The method of claim 6, wherein creating an API message comprising a data payload containing the serial data, and an ECC identifier, comprises:
creating a JSON message.

8. The method of claim 6, wherein creating an API message comprising a data payload containing the serial data, and an ECC identifier, comprises:
creating the data payload as a JSON message.

9. An apparatus comprising:
a serial port and a network port operative to establish an internet connection;
a processor operatively coupled to the serial port and the network port; and
a thin script, stored in non-volatile, non-transitory memory that is operatively coupled to the processor, the thin script operative to:
receive serial data from an emergency communication center (ECC) functional entity operatively coupled to the serial port;
establish a secure authenticated network connection to application programming interface (API) endpoint in a cloud-hosted infrastructure;
obtain serial data from an emergency communication center (ECC) functional entity;
convert the serial data to packet data including an ECC identifier;
send the packet data to the API endpoint; and
resiliently handle connection failures without resetting the processor, comprising
resiliently handling a serial port failure by re-initiation of the serial port without caching data and without resetting the processor.

10. The apparatus of claim 9, wherein the thin script is written using an interpreted, object-oriented, high-level programming language with dynamic semantics.

11. The apparatus of claim 9, wherein the processor is a system on a chip (SoC).

12. The apparatus of claim 9, wherein the processor is an ARM processor.

13. An apparatus comprising:
a serial port and a network port operative to establish an internet connection;
a processor operatively coupled to the serial port and the network port; and
a thin script, stored in non-volatile, non-transitory memory that is operatively coupled to the processor, the thin script operative to:
receive serial data from an emergency communication center (ECC) functional entity operatively coupled to the serial port;
establish a secure authenticated network connection to application programming interface (API) endpoint in a cloud-hosted infrastructure;

obtain serial data from an emergency communication center (ECC) functional entity;

convert the serial data to packet data including an ECC identifier;

send the packet data to the API endpoint; and resiliently handle connection failures without resetting the processor comprising:

resiliently handling internet connection loss without caching data and without resetting the processor by listening for restoration of the internet connection; and resuming sending packet data to the API endpoint in response to restoration of the internet connection.

14. An apparatus comprising:

a serial port and a network port operative to connect to the internet;

a processor operatively coupled to the serial port and the network port, the processor operative to:

receive serial data from an emergency communication center (ECC) functional entity operatively coupled to the serial port;

establish a secure authenticated network connection to application programming interface (API) endpoint in a cloud-hosted infrastructure;

obtain serial data from an emergency communication center (ECC) functional entity;

convert the serial data to packet data including an ECC identifier;

send the packet data to the API endpoint; and resiliently handle connection failures without resetting the processor comprising resiliently handling a serial port failure by re-initiation of the serial port without caching data and without resetting the processor.

15. The apparatus of claim 14, wherein the processor is a system on a chip (SoC).

16. The apparatus of claim 14, wherein the processor is an ARM processor.

17. An apparatus comprising:

a serial port and a network port operative to connect to the internet;

a processor operatively coupled to the serial port and the network port, the processor operative to:

receive serial data from an emergency communication center (ECC) functional entity operatively coupled to the serial port;

establish a secure authenticated network connection to application programming interface (API) endpoint in a cloud-hosted infrastructure;

obtain serial data from an emergency communication center (ECC) functional entity;

convert the serial data to packet data including an ECC identifier;

send the packet data to the API endpoint; and resiliently handle connection failures without resetting the processor comprising:

resiliently handling internet connection loss without caching data and without resetting the processor by listening for restoration of the internet connection; and resuming sending packet data to the API endpoint in response to restoration of the internet connection.

* * * * *